United States Patent
Schenk et al.

(10) Patent No.: US 9,403,217 B2
(45) Date of Patent: Aug. 2, 2016

(54) DRILL CHUCK

(71) Applicants: Peter Schenk, Niederstotzingen (DE);
Markus Nusser, Baechingen (DE);
Hans Baumann, Sontheim (DE)

(72) Inventors: Peter Schenk, Niederstotzingen (DE);
Markus Nusser, Baechingen (DE);
Hans Baumann, Sontheim (DE)

(73) Assignee: ROEHM GMBH, Sontheim (DE)

( * ) Notice: Subject to any disclaimer, the term of this patent is extended or adjusted under 35 U.S.C. 154(b) by 181 days.

(21) Appl. No.: 14/074,987

(22) Filed: Nov. 8, 2013

(65) Prior Publication Data

US 2014/0131957 A1    May 15, 2014

(30) Foreign Application Priority Data

Nov. 12, 2012   (DE) .......................... 10 2012 110 809

(51) Int. Cl.
*B23B 31/12* (2006.01)

(52) U.S. Cl.
CPC .......... *B23B 31/1238* (2013.01); *B23B 31/123* (2013.01); *B23B 2231/38* (2013.01); *Y10T 279/17615* (2015.01); *Y10T 279/17632* (2015.01); *Y10T 279/32* (2015.01)

(58) Field of Classification Search
CPC ............ B23B 31/1238; B23B 2231/38; B23B 31/123; Y10T 279/17632; Y10T 279/32; Y10T 279/17615
See application file for complete search history.

(56) References Cited

U.S. PATENT DOCUMENTS

| | | | |
|---|---|---|---|
| 4,627,627 A | 12/1986 | Roehm | |
| 5,348,317 A | 9/1994 | Steadings et al. | |
| 5,624,125 A | 4/1997 | Rohm | |
| 5,765,839 A | 6/1998 | Roehm | |
| 5,882,153 A | 3/1999 | Mack | |
| 5,927,914 A | 7/1999 | Mack | |
| 6,550,785 B2 * | 4/2003 | Rohm | B23B 31/123 279/140 |
| 7,654,539 B2 * | 2/2010 | Yang et al. | 279/62 |
| 8,061,719 B2 * | 11/2011 | Mack | 279/62 |
| 2002/0000698 A1 * | 1/2002 | Rohm | 279/62 |
| 2003/0042692 A1 * | 3/2003 | Sakamaki et al. | 279/62 |
| 2004/0021275 A1 * | 2/2004 | Sakamaki et al. | 279/62 |
| 2005/0127618 A1 * | 6/2005 | Baumann | B23B 31/1238 279/60 |
| 2008/0067761 A1 * | 3/2008 | Mack | B23B 31/123 279/61 |
| 2010/0127464 A1 * | 5/2010 | Mack | B23B 31/123 279/62 |
| 2010/0207337 A1 * | 8/2010 | Bordeianu | B23B 31/123 279/62 |

FOREIGN PATENT DOCUMENTS

| | | |
|---|---|---|
| DE | 2354832 A1 | 5/1975 |
| DE | 202005016952 U | 2/2006 |

* cited by examiner

*Primary Examiner* — Eric A Gates
*Assistant Examiner* — Paul M Janeski
(74) *Attorney, Agent, or Firm* — Andrew Wilford

(57) ABSTRACT

A drill-chuck body is rotatable about an axis and formed with a plurality of passages opening axially rearward at a rear face of the body and radially outwardly at windows in a side of the body. Jaws displaceable between front and rear positions in the passages each have a row of teeth exposed radially outwardly at the respective windows. A tightening ring rotatable about the axis is formed with an internal screwthread engaged at the windows with the teeth such that rotation of the ring moves the jaws between the front and rear positions. A tightening sleeve fitted around and coupled rotationally to the tightening ring extends axially rearward past the windows. This brace ring is radially inwardly engaged with the body and engages radially outwardly between the windows and the rear face with the tightening sleeve so as to coaxially center it on the body.

9 Claims, 4 Drawing Sheets

DRILL CHUCK

FIELD OF THE INVENTION

The present invention relates to a chuck. More particularly this invention concerns a lockable drill chuck.

BACKGROUND OF THE INVENTION

A standard drill chuck such as used in a hammer drill and as disclosed in U.S. Pat. No. 5,765,839 has a body provided centered on an axis with an annular array of ratchet teeth and a plurality of jaws radially displaceable relative to the body between inner and outer positions. To this end the body is formed with guides angularly equispaced about the axis, open at front and rear ends at front and rear faces of the chuck body, and also opening at windows on the side of the body where teeth on the outer edges of the jaws are exposed. A tightening ring is axially fixed but rotatable about the axis on the body in a tightening direction and in an opposite loosening direction and an internal screwthread on the tightening ring engages the teeth of the jaws to move them radially together and axially forward on rotation of the tightening ring in the tightening direction and radially apart and axially rearward on rotation of the tightening ring in the loosening direction.

A locking element engageable with the teeth and angularly fixed on the tightening ring is radially displaceable between a locking position engaging the ratchet teeth and preventing rotation of the body in the loosening direction and a freeing position permitting free rotation of the body relative to the tightening ring. A setting ring angularly displaceable on the tightening ring is formed with a pair of angularly spaced and radially open seats. A pair of angularly spaced abutments between the setting ring and the tightening ring limit angular movement of the sleeve on the ring. A cam on the setting ring is engageable with the locking element for displacing the locking element into the locking position when the setting ring is in one of its end positions and for displacing the locking element into the freeing position when the setting ring is in the other of its end positions. This locking system, which has proven successful in very large production runs on the market, allows an outwardly directed force to be applied to the tightening sleeve, which force requires the tightening sleeve to be supported radially on the chuck body in order to ensure optimal concentricity.

DE 20 2005 016 952 discloses a closure disk that braces the tightening sleeve against the chuck body and also braces the tightening sleeve on the chuck body at the rear face of the drill chuck.

U.S. Pat. Nos. 5,882,153 and 5,927,914 discloses a so-called short drill chuck in which the jaws exit project from the guide seats when these jaws are adjusted to wider tool-shank diameters, and project beyond the rear face of the chuck body when in their extreme position. The parts of the jaws the project beyond the rear face of the chuck body are accommodated here by the spindle housing of a drive unit that can be attached to the drive-spindle seat.

In the case of short drill chucks that include a locking unit, however, the guide configuration of the jaws makes it impossible to mount a closure disk at the rear face of the chuck body so as to guide the tightening sleeve thereon since this closure disk must have through-holes so as to ensure that the jaws can project beyond the rear face of the chuck body. The problem is thus often found in these drill chucks that concentricity is impaired, and this results in reduced service life and unwanted vibrations.

OBJECTS OF THE INVENTION

It is therefore an object of the present invention to provide an improved chuck.

Another object is the provision of such an improved hammer-drill chuck that overcomes the above-given disadvantages, in particular that has a so-called short chuck and that also is protected against concentricity problems and vibration.

SUMMARY OF THE INVENTION

A drill chuck has according to the invention a chuck body rotatable about a chuck axis and formed with a plurality of passages opening axially rearward at a rear face of the body and radially outwardly at windows in a side of the body. Respective jaws displaceable between front and rear positions in the passages each have a row of jaw teeth exposed radially outwardly at the respective windows. A tightening ring rotatable about the axis is formed with an internal screwthread engaged at the windows with the jaw teeth such that rotation of the ring moves the jaws between the front positions and the rear positions. A tightening sleeve fitted around and coupled rotationally to the tightening ring extends axially rearward past the windows. A brace ring is radially inwardly engaged with the chuck body and operatively engaged radially outwardly between the windows and the rear face with the tightening sleeve so as to coaxially center the tightening sleeve on the chuck body.

Positioning the brace ring between the openings and the windows easily enables the support for the tightening sleeve to be provided on the chuck body without covering the rear face of the chuck body.

It has been found advantageous if the chuck body is a short and if the jaws in the open position project beyond the rear face of the chuck body. Appropriately positioning the brace ring on the chuck body radially supports the tightening sleeve, in particular in short drill chucks.

It has been found especially advantageous if the threaded tightening ring is rotationally fixed to an intermediate sleeve supporting a locking element that in turn is biased radially against the tightening sleeve by a spring and can be inserted into the locking recess by a radial cam provided on the tightening sleeve. This locking recess, being on a coaxial ring, is rotationally fixed to the chuck body. As a result, any unintended opening of the jaws is prevented in the usual proven manner, and this positively affects the functionality of the drill chuck according to the invention. It has furthermore proven successful in this regard if the locking element is a spring clip supported on the inner surface of the intermediate sleeve and engaging a cam through a slot in the radial cam so that it can be moved between a position engaging in the ratchet teeth and a released position when the tightening sleeve is rotated relative to the intermediate sleeve. As a result, simply rotating the tightening sleeve enables the locking element to be adjusted by the radial cam.

It has furthermore been found advantageous if the brace ring comprises a cylindrical section for attachment to the chuck body and a radial flange to guide the tightening sleeve. The flat cylindrically shaped section of the brace ring provides easy attachment to the chuck body, although another conceivable approach within the scope of the invention is for the brace ring to be rotatably supported on the chuck body. In addition, the radial flange, which is preferably at the end of the cylindrical section directed axially rearward of the chuck body, provides an extremely simple means of supporting the tightening sleeve on the chuck body. Provision is of course also made within the scope of the invention for the entire outer edge of the cylindrically shaped part of the brace ring to be supported on the tightening sleeve.

It has been found especially advantageous if the brace ring is attached to the chuck body so as to be rotationally fixed and axially immovable. This approach, for example, also allows axial support for other components associated with the chuck body to be provided on the brace ring—in addition to the radial support of the tightening sleeve on the chuck body.

It has been found advantageous here if the brace ring is pressed onto the chuck body, which aspect has a positive effect on assembly cost. It is furthermore especially advantageous in this regard if positive-engagement teeth are provided on the outer surface of the chuck body between the openings and the windows. This provides very secure attachment between the brace ring and the chuck body, which attachment also necessitates only a small cost in terms of assembly.

However, according to the invention the brace ring is created as one unitary piece with the chuck body. This has a positive benefit for the production process by eliminating the need to attach the brace ring to the chuck body.

Another approach that has proven advantageous is if the brace ring is extended axially beyond the rear face of the chuck body as a support sleeve, and if the tightening sleeve is located directly on the brace ring. Axially extending the support sleeve beyond the rear face of the chuck body, in particular, can prevent drill particles from getting into the interior of the drill chuck due to the fact that connecting a drill spindle creates an overlap of the drive-unit housing by the support sleeve. What has been found equivalent in this regard is if the intermediate sleeve is extended axially beyond the rear face of the chuck body, and if the tightening sleeve is braced indirectly on the brace ring through the intermediate sleeve. This too is a simple approach to providing an overlap with the machine housing of a drill spindle, thereby also preventing contamination of the drill chuck.

It has been found especially advantageous in a drill chuck according to the invention if the threaded ring is created as one integrated piece, and is secured axially either directly or indirectly by the tightening sleeve. This enables the drill chuck according to the invention to be easily assembled by installing the individual parts of the drill chuck from the front that is from the side facing away from the drive-spindle seat.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
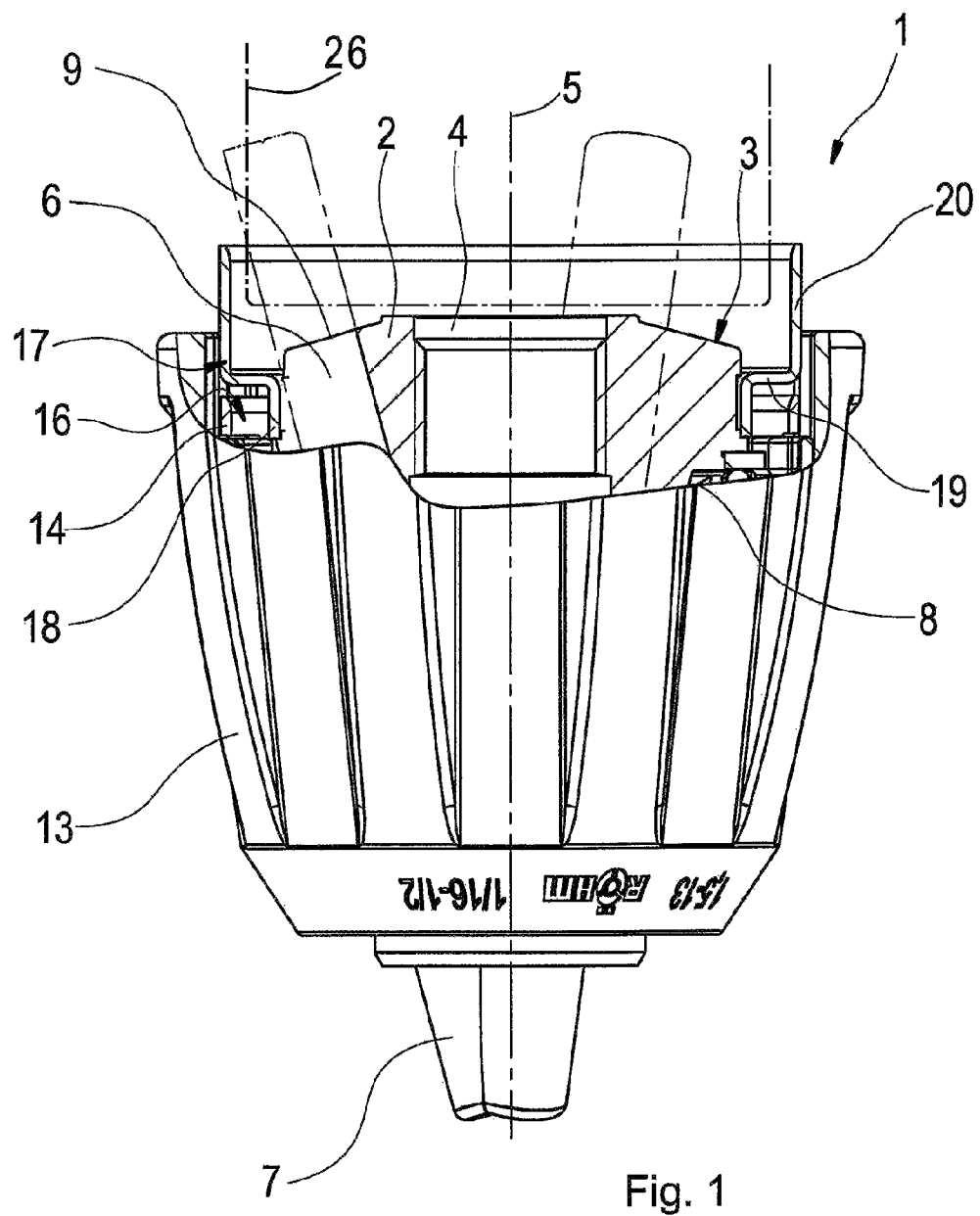
FIG. 1 is a partly sectional view of a drill chuck including a brace ring that is extended axially beyond the drill chuck.

As seen in FIG. 1 a drill chuck 1 according to the invention has a chuck body 2 having a drive-spindle seat opening at its rear face 3. Guide grooves 6 holding respective gripper jaws 7 are angled relative to and angularly equispaced around an axis 5 of the chuck body 2. The guide grooves 6 open radially outwardly at windows 8 and rearwardly at rear ends 9 on the rear face 3. The chuck body 2 here is short so that the jaws 7 in the guide grooves 6 project in the open position rearwardly past the rear face 3 of the chuck body 2 as shown in dot-dash lines in FIG. 1.

The jaws 7 each an outer edge formed with a row of teeth 10 that mesh with an internal screwthread 11 of a threaded tightening ring 12 that is rotatable about the axis 5 but axially nondisplaceable on the chuck body 2 at the windows 8 where the jaws 7 are radially outwardly exposed. The ring 12 is rotationally coupled to a tightening sleeve 13 that is rotatable about the axis 5 on the chuck body 2. The chuck body 2 projects slightly forwardly from the front end of the sleeve 13 and, in the closed position, the jaws 7 also project forwardly from the body 2 as shown in FIG. 1.

This ring 12 also carries an intermediate sleeve 14 in turn coupled to a locking element 16 in the form of a spring clip 15 that interacts with an unillustrated radially inwardly projecting cam formation on the tightening sleeve 13. This element 16 bears radially outward with a spring force on this radial cam formation and thus negatively affects concentricity characteristics.

Figure 2:
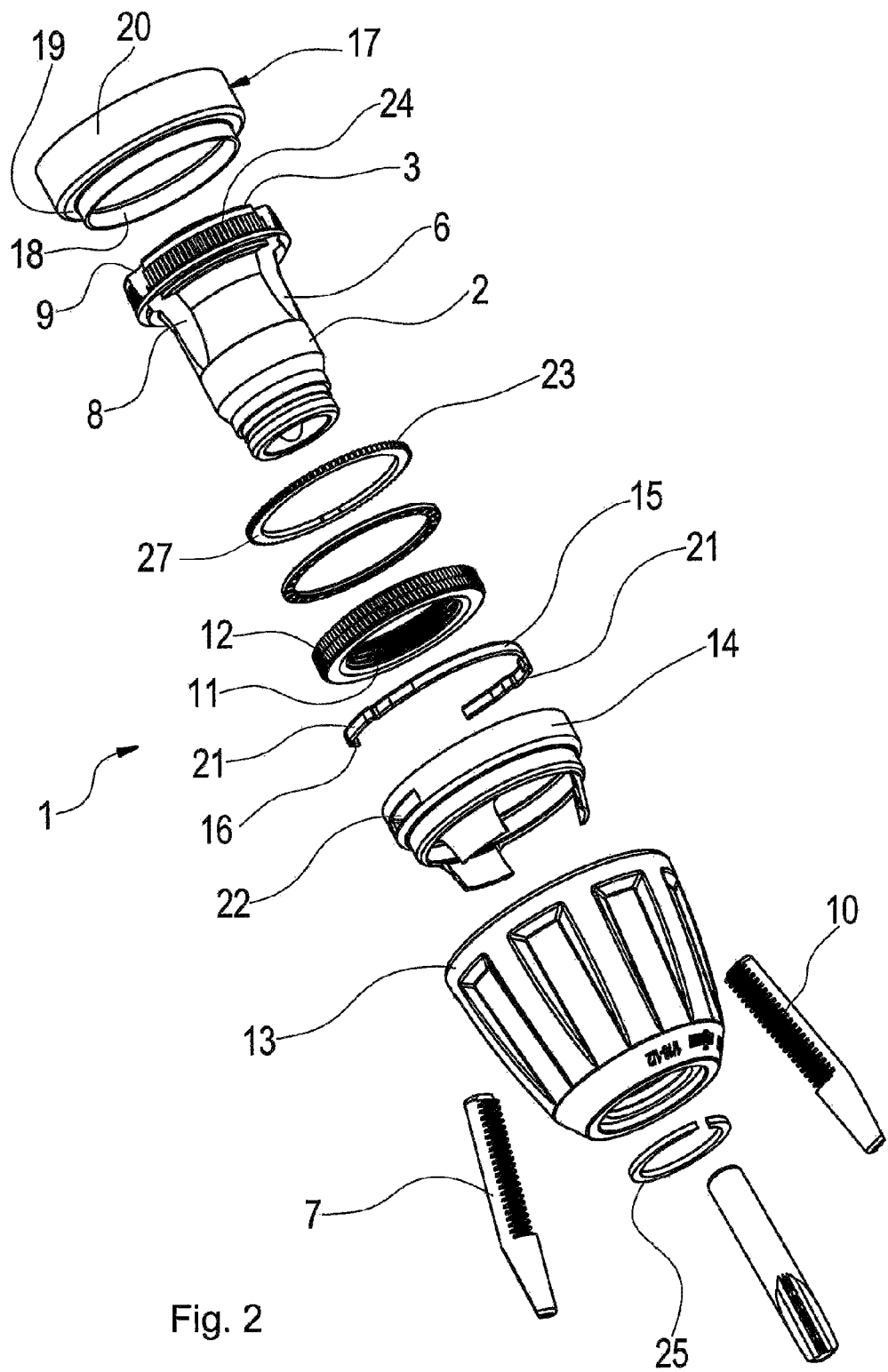
FIG. 2 is an exploded view of the drill chuck including axially extended brace ring.

In order to prevent this eccentricity from causing the chuck to vibrate, a brace ring 17 is provided on the chuck body 2 to radially support the tightening sleeve 13 and may even be unitarily formed with the chuck body 2. Here, however, this brace ring 17 has a front cylindrical portion 18 fitted around the chuck body 2 and provided on its rear end with a radially outwardly projecting, planar, and annular flange 19 bearing operatively outward on the tightening sleeve 13. In the embodiment of FIGS. 1 and 2, the ring 17 is extended axially beyond the rear chuck end 3 from the radial outer edge of the flange 19 as a cylindrical sleeve 20. This ensures that an overlap is created between chuck drill chuck 1 and the machine housing of the drive unit when the drill chuck 1 is attached to a drive spindle, thereby effectively preventing any drilling particles from penetrating into the drill chuck.

FIG. 2 is an exploded view illustrating the drill chuck 1 according to the invention. Here the locking element 16 formed as a spring clip 15 bears on the inside of the intermediate sleeve 14 and is formed with bumps 21 that act on the tightening sleeve 13 through slots 22 formed in the intermediate sleeve 14. Also shown is a ring 27 formed with external ratchet teeth 23 and fixed against rotation on the chuck body 2. The locking element 16 engages these teeth 23 when the chuck is locked as described in above-cited U.S. Pat. No. 5,765,839 that is herewith incorporated by reference.

Figure 3:
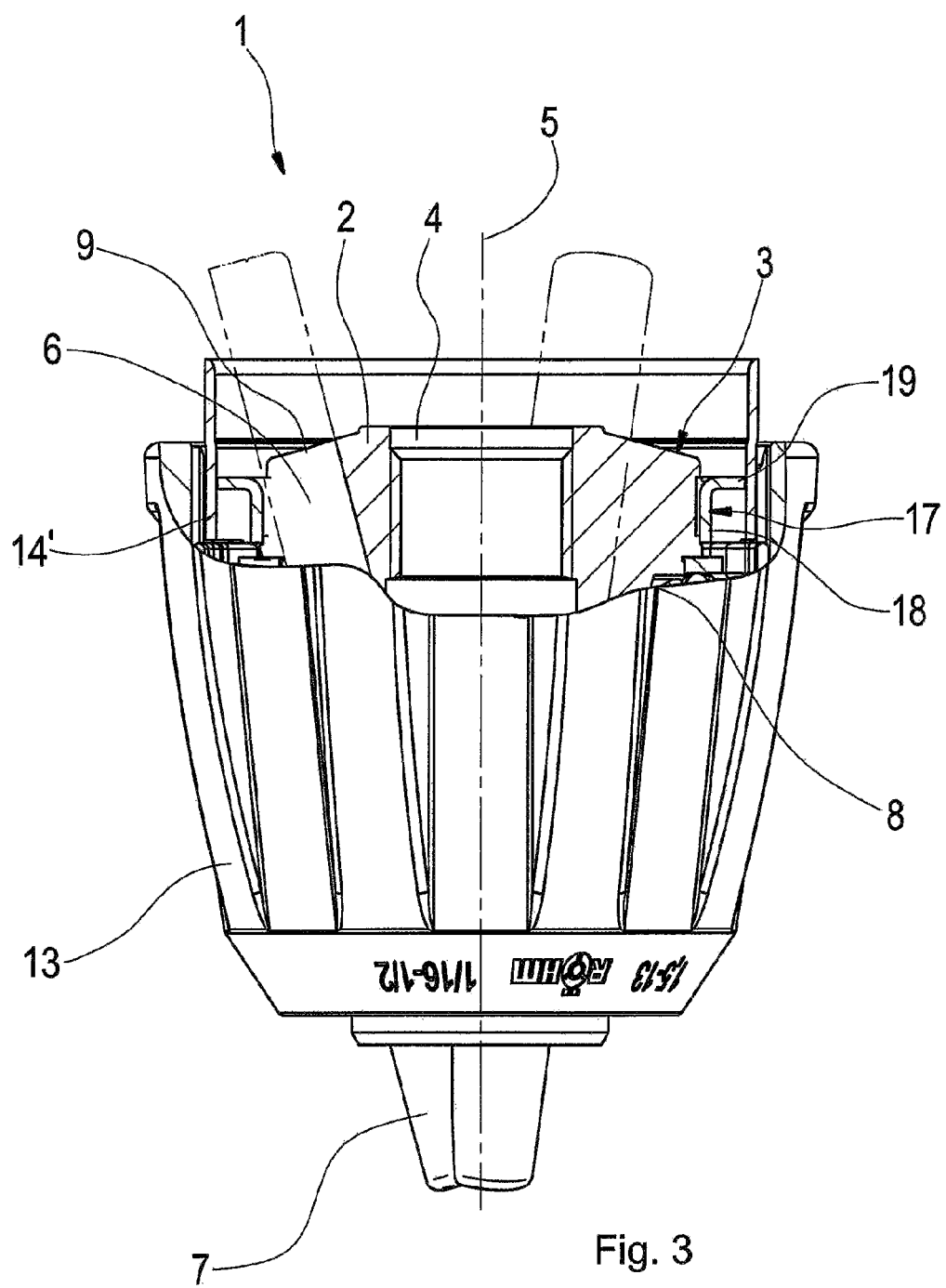
FIG. 3 is a partly sectional view of a drill chuck including an axially extended intermediate sleeve.

FIG. 3 shows another drill chuck 1 according to the invention where the intermediate sleeve 14 has a rearward axial extension collar 14' projecting axially beyond the rear face 3 of the chuck body 2 so as to fit around a machine housing shown schematically at 26 that normally engages around the unillustrated drive spindle fitting in the seat 4. In the embodiment shown in FIG. 3, the tightening sleeve 13 is radially braced against the chuck body 2 indirectly through the extension 14' of the intermediate sleeve 14 and the brace ring 17.

Figure 4:
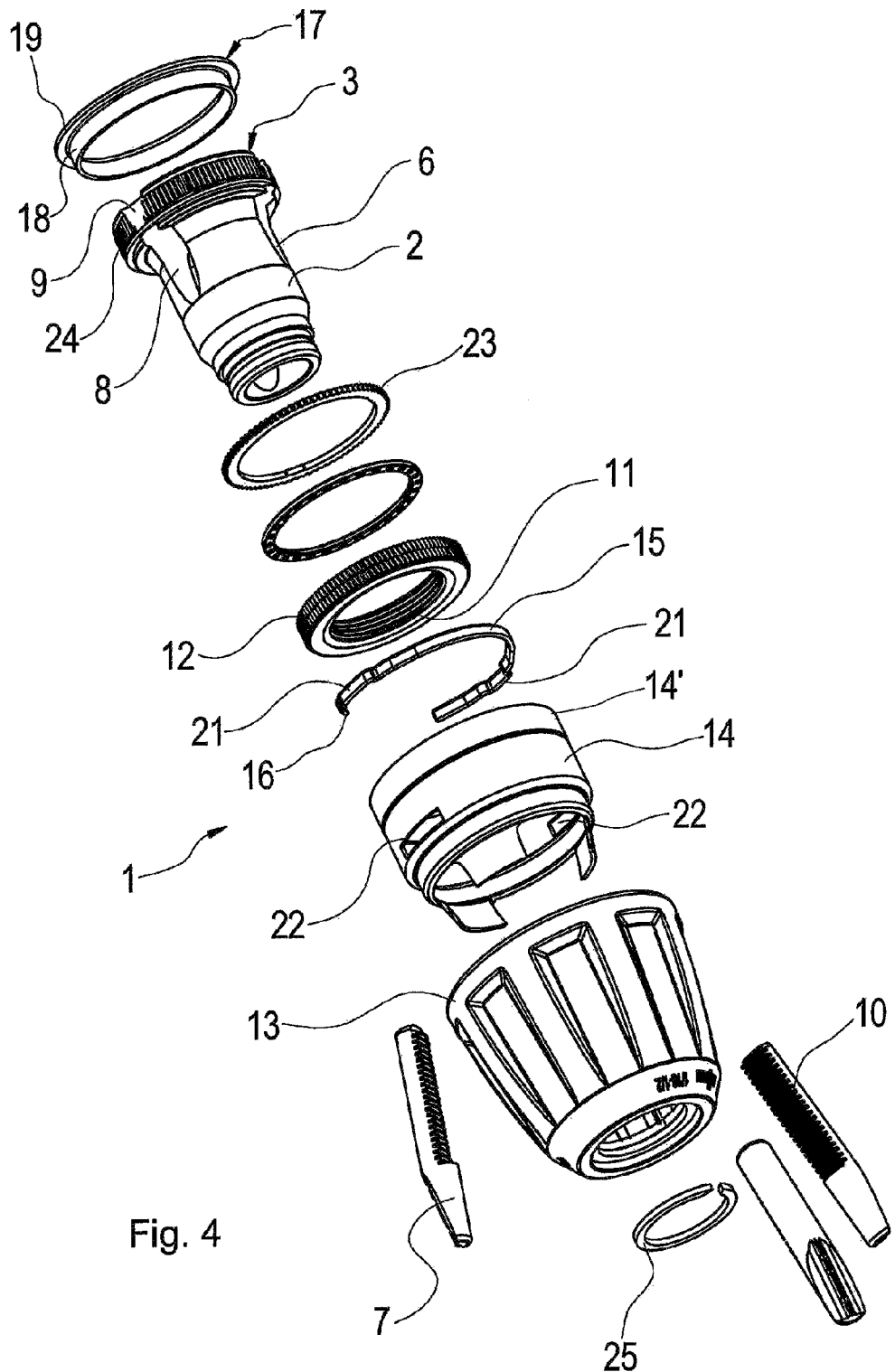
FIG. 4 is an exploded view of the drill chuck of FIG. 3.

The exploded view of FIG. 4 shows, in particular, the radial flange 19 that radially enlarges the cylindrical section 18 of the brace ring 17, and is provided to indirectly support the tightening sleeve 13 on the chuck body 2 through the intermediate sleeve 14. Thus the brace ring 17 does not have the rearward cylindrical extension 20, which is replaced by the extension 14'.

FIG. 4 furthermore reveals that the drill chuck 1 according to the invention is easily assembled. The brace ring 17 is first attached to the chuck body 2 by being pressed onto the chuck body 2 that has teeth 24 for this purpose for rotationally locking it in place. The ring 27 carrying the ratchet teeth 23 is then inserted axially onto the chuck body 2. Placing the locking element 16 in the intermediate sleeve 14 creates a subassembly that is then inserted from the front onto the chuck body 2. Finally, the tightening sleeve 13 is fitted on from the front, and its axial position is fixed by a snap ring 25.

We claim:

1. A drill chuck comprising:
    a chuck body rotatable about a chuck axis and formed with a plurality of passages opening axially rearward at a rear face of the body and radially outwardly at windows in a side of the body;
    respective jaws displaceable between front and rear positions in the passages, each having a row of jaw teeth exposed radially outwardly at the respective windows, and projecting in the rear positions axially rearward past the rear face;
    a tightening ring rotatable about the axis and formed with an internal screwthread engaged at the windows with the jaw teeth such that rotation of the ring moves the jaws between the front positions and the rear positions;
    a tightening sleeve fitted around and coupled rotationally to the tightening ring and extending axially rearward past the windows;
    a brace ring radially inwardly snugly radially inwardly engaged with the chuck body and bearing radially outwardly between the windows and the rear face on the tightening sleeve so as to coaxially center the tightening sleeve on the chuck body;
    an intermediate sleeve rotatable on the body about the axis and formed with an axially rearwardly projecting cylindrical extension, the brace ring bearing radially outward through the extension on the tightening sleeve;
    a cam formation on the tightening sleeve;
    a locking element rotationally fixed to the intermediate sleeve and spring biased radially into engagement with the cam formation of the tightening sleeve; and
    an annular array of teeth fixed on the chuck body, the cam formation and tightening sleeve being displaceable to press the locking element into engagement with the teeth to lock the tightening element and sleeve against rotation on the chuck body in at least one direction.

2. The drill chuck defined in claim 1, wherein the locking element is a spring clip inside the intermediate sleeve formed with a bump fitted with the intermediate sleeve for rotationally coupling the clip with the intermediate sleeve such that rotation of the tightening sleeve relative to the intermediate sleeve moves the locking element between a position engaging the teeth of the chuck body and a position disengaged therefrom.

3. The drill chuck defined in claim 1, wherein the bracing sleeve is of L-section and has a cylindrical part fitted radially around the chuck body and a substantially planar radially extending flange having an outer edge bearing radially outward on the cylindrical extension and therethrough on the tightening sleeve.

4. The drill chuck defined in claim 3, wherein the chuck body is formed at the axis with a rearward drive-spindle seat open at the rear face and the extension of the intermediate ring extends axially rearward past the rear face and surrounds the area around the seat.

5. The drill chuck defined in claim 1, wherein the brace ring is tightly fitted to the chuck body.

6. The drill chuck defined in claim 5, wherein the chuck body is formed between the windows and the rear face with an annular array of outwardly projecting teeth with which the brace ring is fitted.

7. The drill chuck defined in claim 1, wherein the brace ring is engaged directly radially inwardly with the chuck body and directly radially outwardly with the tightening sleeve.

8. A drill chuck comprising:
    a chuck body rotatable about a chuck axis and formed with a plurality of passages opening axially rearward at a rear face of the body and radially outwardly at windows in a side of the body;
    respective jaws displaceable between front and rear positions in the passages, the jaws each having a row of jaw teeth exposed radially outwardly at the respective windows;
    a tightening ring rotatable about the axis and formed with an internal screwthread engaged at the windows with the jaw teeth such that rotation of the ring moves the jaws between the front positions and the rear positions;
    a tightening sleeve fitted around and coupled rotationally to the tightening ring and extending axially rearward past the windows; and
    a brace ring the brace ring has a small-diameter cylindrical part fitted snugly radially inward around the chuck body, a substantially planar flange extending radially outward from an end of the cylindrical part, and a large-diameter cylindrical part fitted inside the tightening sleeve and extending axially from an outer edge of the flange into operative radially outward engagement between the windows and the rear face with the tightening sleeve so as to coaxially center the tightening sleeve on the chuck body.

9. The drill chuck defined in claim 8, wherein the chuck body is formed at the axis with a rearward drive-spindle seat open at the rear face and the large-diameter part extends axially rearward past the rear face and surrounds the area around the seat.

* * * * *